Patented Aug. 30, 1932

1,875,124

UNITED STATES PATENT OFFICE

WILLIAM REGINALD ORMANDY, OF LONDON, ENGLAND

RECOVERY OF ACETONE

No Drawing. Application filed March 7, 1929, Serial No. 345,237, and in Great Britain March 14, 1928.

This invention relates to the recovery of acetone from gases containing the same, and in particular from air used in drying operations in the production of artificial silk. Hitherto it has been usual to employ either water or cresylic acid as the absorbing liquid, but the absorptive capacity of these liquids is small so that, with the amount of acetone usually contained in the air or gases, the final concentration of acetone in the washing liquid is only a few per cent. With water for example, a concentration of 1 per cent is obtained when the air contains 8.4 grammes of acetone per cubic metre, and the concentration is only as high as 4 per cent when the air contains 26.5 grammes of acetone per cubic metre. The absorption with cresylic acid is better than with water, but there are practical difficulties in its use and manipulation.

It has now been found that various solvents which might have been expected to be useful are, if anything, less effective than water itself. In accordance with the present invention, however, an inorganic acid in a fairly high state of concentration is employed as a solvent to effect the absorption and recovery of acetone, and by using such a solvent the result is much more satisfactory than either with water or cresylic acid. In particular, fairly concentrated sulphuric acid or phosphoric acid is found to be effective.

In practice, it is convenient to cause the gases containing the acetone to flow through a series of scrubbing towers, through which the acid employed flows down in counter-current to the gases. The absorption of acetone in strong sulphuric acid gives rise to the evolution of heat amounting to about 45,000 calories per litre of the acetone absorbed; it is desirable, therefore, to cool the scrubbing towers. Further, it is desirable to dilute the acid in order that the temperature necessary for distilling off the acetone may be lower than would be the case if the acid were maintained in the concentrated condition.

In order that the invention may be clearly under and readily carried into effect, an example of the improved process will now be described in somewhat greater detail.

A series of scrubbing towers are employed, each being enclosed so that the air containing the acetone is admitted at the foot of one tower and is taken off from the top of the tower without loss, and admitted to the foot of the next tower, and so forth while the towers are cooled. The concentrated acid which, for example, may be sulphuric acid in 130° Tw. is supplied to the top of the last tower so that the strong acid first encounters the air from which the greater part of the acetone has been abstracted. The acid containing some acetone is pumped up by a circulating pump to the head of the last but one scrubbing tower, in which it takes up more acetone, and from the foot of that tower is again pumped up by a circulating pump until it has passed in counter-current with the gases through the whole series of towers.

The saturated acid from the towers is distilled, by which means the acetone is recovered. It is preferred to dilute the acid leaving the towers to a strength of 95° Tw. and then to fractionate the liquid, which is heated by steam in a coil or by direct heat, or live steam may be blown into the acid so that the acetone comes off continuously at a strength of 50 per cent by volume. This acetone may then be rectified in a separate still or concentrating unit. Heat exchangers may be employed where convenient to economize in heating and may, for example, take up heat at the point in the cycle where heat is evolved due to absorption of the acetone by the sulphuric acid, and later by dilution of the acid with water.

The strength of the acid falls off somewhat during its passage through the towers, owing to absorption of moisture from the gases passed through the towers when outside air is used. This can be avoided by returning the dried air free from acetone issuing from the final scrubbing tower for use in the plant where the acetone is taken up, so that the same air is continuously circulated throughout the process and has no opportunity to absorb external moisture. If this is not done, the absorption of moisture from the atmosphere will lower the density of the acid, usually by about 10 to 20° Tw. As a matter of fact, if phosphoric acid is used to absorb the acetone, this dilution will generally be sufficient and will render unnecessary the addition of further water before distilling.

As regards the density of the sulphuric acid to be used, it has already been mentioned that sulphuric acid of a strength of 130° Tw. is suitable. When that strength of acid is employed, it is possible to obtain concentrations of acetone of 10, 20, 30 and 40 per cent of the acid used when the amount of acetone in the air is only 1.8, 4.6, 8.5 and 14.2 grammes per cubic metre of air respectively. Acid may be used of 130° Tw., 125° Tw., 120° Tw., 115° Tw., or even of a strength of 110° Tw., and corresponding percentage absorptions of acetone may be obtained, but, of course, with progressively larger proportions of acetone in the air. Thus, with acid of a strength of 110° Tw., the concentrations of acetone of 10, 20, 30 and 40 per cent of the acid used may be obtained, but in that case the amount of acetone in the air needs to be respectively 7.7, 16.5, 26.9 and 40.5 grammes per cubic metre.

With sulphuric acid, it is not advisable to use a higher strength than 130° Tw. if commercial acetone is being dealt with as otherwise some decomposition of the acetone occurs. However, this does not apply in the case of pure acetone, in which case there is no difficulty in using the most concentrated acid.

With phosphoric acid, good results may be obtained with concentrations of 130 and 150° Tw. With 130° Tw. strength, the absorption is slightly better than with sulphuric acid of 115° Tw., and with phosphoric acid of 150° Tw. strength, the absorption of acetone is better than with sulphuric acid at 130° Tw.

Sulphuric acid of the concentrations referred to can be used in plants employing iron vessels and piping, but phosphoric acid of the concentrations referred to above will attack iron, so that the plant for use with phosphoric acid is more difficult and expensive to construct. Sulphuric acid of 130° Tw. strength is about 60 times as effective as water in regard to the absorption of acetone, and as already mentioned, phosphoric acid of 150° Tw. strength is found more effective, particularly in obtaining lower concentrations of acetone when dealing with air in which it is contained in the smaller proportions.

The sulphuric acid may conveniently be diluted to a strength of at least 80° Tw., which is equivalent to 50 per cent by weight of acid, but it is necessary to dilute the sulphuric acid containing the acetone to not more than 95° Tw., which is equivalent to 57 per cent by weight of sulphuric acid in order to avoid decomposition and loss of acetone which may arise owing to the high boiling point and the strength of the acid. With sulphuric acid, there appears to be always a very small amount of secondary products formed which are of higher boiling point than the acetone, and these amount to 0.5 per cent of the acetone recovered, so that the loss is very small, and the secondary products are, in fact, themselves capable of being used as solvents. No such decomposition appears to occur with phosphoric acid of 130° Tw. Therefore, the necessity of diluting in the case of phosphoric acid simply depends upon whether it is desired to keep down the boiling point during the distillation of the acetone, bearing in mind that the boiling point steadily rises with the increase of concentration of the acetone.

If ethyl alcohol and esters, such as methyl or ethyl acetate, be present in addition to the acetone to be recovered, the novel process will also result in recovery of these additional bodies, which, however, are easily separated on re-distillation, although in the case of the esters some hydrolysis may occur after dilution.

I claim:—

1. A method of recovering acetone from gas containing same, which comprises bringing said gas into contact with an acid taken from the group consisting of sulphuric acid and phosphoric acid, in a fairly high state of concentration to absorb the acetone.

2. A method of recovering acetone from gas containing same, which consists in bringing said gas into contact with an acid taken from the group consisting of sulphuric acid and phosphoric acid, in a fairly high state of concentration and removing the acetone from said acid.

3. A method of recovering acetone from gas containing same, which consists in bringing said gas into contact with an acid taken from the group consisting of sulphuric acid and phosphoric acid, in a fairly high state of concentration and removing the acetone from concentration by fractional distillation of the said acid at a temperature below that at which substantial decomposition sets in.

4. A method of recovering acetone from gas containing same, which consists in circulating said gas in countercurrent with an acid taken from the group consisting of sulphuric acid and phosphoric acid, in a fairly high state of concentration and removing the acetone from said acid.

5. A method of recovering acetone from gas containing same, which consists in bringing said gas into contact with sulphuric acid in a fairly high state of concentration and removing the acetone from said sulphuric acid.

6. A method of recovering acetone from gas containing same, which consists in circulating said gas in counter-current with sulphuric acid in a fairly high state of concentration and separating the acetone from said sulphuric acid by distilling the latter.

7. A method of recovering acetone from gas containing same, which consists in bringing said gas into contact with sulphuric acid of a density of from 110 to 130 degrees Twaddell and removing the acetone from said sulphuric acid.

8. A method of recovering acetone from gas containing same, which consists in bringing said gas into contact with sulphuric acid in a fairly high state of concentration, diluting said sulphuric acid to a strength of at least fifty per cent by weight of acid, and removing the acetone from said sulphuric acid without substantial decomposition of the acetone.

9. A method of recovering acetone from gas containing same, which consists in bringing said gas into contact with sulphuric acid in a fairly high state of concentration, diluting said sulphuric acid to a strength of at least fifty per cent by weight of acid, and removing the acetone from said sulphuric acid by fractional distillation of the latter at a temperature below that at which substantial decomposition sets in.

10. A method of separating acetone from air bearing acetone and amounts of other solvents which consists in bringing said air into intimate contact with sulphuric acid in a fairly high state of concentrattion and separating the acetone from said acid by distillation.

11. A method of recovering acetone from gas containing the same which consists in bringing said gas into contact with sulphuric acid of a strength of from 110 to 130° Tw., diluting said sulphuric acid to a strength of from 80 to 95° Tw., and removing the acetone from said sulphuric acid without substantially decomposing the acetone.

In witness whereof I hereunto subscribe my name this 26th day of February 1929.

WILLIAM REGINALD ORMANDY.